United States Patent Office 3,382,201
Patented May 7, 1968

3,382,201
PROCESS OF BLENDING PEARLESCENT PLATE-
LETS IN TOUGH MOLDING RESIN AND PREP-
ARATION OF PEARLESCENT PLASTIC ARTI-
CLES FROM THE RESULTING BLEND
Ira H. Gutman and Jules Pinsky, West Hartford, Conn.,
assignors to Monsanto Company, a corporation of
Delaware
No Drawing. Filed Nov. 22, 1963, Ser. No. 325,745
9 Claims. (Cl. 260—31.8)

This invention relates to an improvement in the manufacture of lustrous plastic articles. More particularly, it relates to the production of articles from a polyolefin such as a high-density polyethylene, having a pearlescent or velvety appearance. Still more particularly it relates to an improved process for incorporating pearlescent crystals such as basic lead carbonate in a tough molding resin such as high-density polyethylene which is to be used in blow molding and similar thermoforming operations.

It is well known that the incorporation or dispersion of various materials in small crystal or flake form in plastics such as low-density polyethylene gives an attractive lustrous pearlescent appearance to bottles or other articles thermoformed or molded therefrom. This expedient has been frequently used in the past to improve the normally dull and often rough appearance of such products. In the prior art the incorporation of such pearlescent pigments in the molding resin was generally accomplished in substantially the same manner as that used for incorporating other solid pigments or colors. i.e., by first preparing a resin master batch very highly loaded with the desired pigment. Thus, in such a typical operation the pearlescent pigment, either as such or preferably as a concentrated paste or suspension in a liquid vehicle, was blended in a concentration of about 50 to 75% into a batch of "natural" unpigmented polyethylene resin by intense mechanical working or kneading in a Banbury mixer or similar device, the resulting highly loaded master batch was ground to a powder, the resulting pigmented resin powder passed through an extruder with enough additional natural polyethylene resin to give pellets of a resin concentrate containing about 5 to 10% of pearlescent solids, and this concentrate was then passed once more through an extruder together with additional pelletized "natural" resin or with appropriately colored or otherwise compounded resin, to make a molding powder possessing the desired final color and other qualities. Of course, the resulting molding powder was finally subjected to still another extrusion or high shear operation in the final thermoforming step wherein it was converted into the desired plastic bottle or other article. Typically, then, such prior art processing involved at least three successive passes of the resin and pearlescent material through a high shear mixing zone such as a Banbury mixer, an extruder, a rubber mill or a combination of such devices.

The described conventional blending and processing technique has been quite satisfactory for blending ordinary pigments and even pearlescent crystals into relatively soft and low melting thermoplastics such as the low-density polyethylene, polystyrene and the like. However, the old technique was found to produce disappointing results when attempts were made to formulate pearlescent compositions based on the more modern thermoplastics such as Ziegler-style high-density polyethylene or polypropylene which are characterized both by considerably higher molecular weight and melt point, and a substantially lower degree of translucence, than low-density polyethylene. In particular, attempts to make pearlescent compositions from the newer resins soon lead to the realization that substantially greater concentrations of the pearlescent material were required with the more opaque, high melting resins than with low-density polyethylene, but even at these greater concentrations the pearlescence obtained was noticeably less effective than one would have expected.

It is an object of this invention to provide an improvement in the manufacture of pearlescent articles from molding resins. A more specific object is to devise an improved technique for incorporating a pearlescent solid such as lamellar basic lead carbonate in a tough, high molecular weight molding resin such as high-density polyethylene, with minimum degradation of the pearlescent material. Another object is to make more effective use of pearlescent pigments in thermoplastics so as to maximize the pearlescent effect, thereby permitting the use of lower concentrations of these rather costly pigments. A further object is to improve the effectiveness and cost of producing attractively lustrous, softly colored articles from high-density polyethylene molding powder containing a relatively low concentration of pearlescent pigment. These and other objects, as well as the nature, scope, operation and advantages of this invention, will become more clearly apparent from the subsequent description. It should be understood that proportions of materials are expressed throughout on a weight basis, unless otherwise indicated.

It has now been discovered that pearlescent or nacreous pigments can be most effectively incorporated in the tough new thermoplastics by a process wherein the shearing forces and high temperatures to which the material is exposed are kept to a minimum. More specifically, a new blending process has been devised wherein a concentrated paste of the pearlescent material is gently mixed with the molding powder by stirring or tumbling the mixture for a few minutes in an open container or a partially filled mixing drum without applying any substantial back pressure to the mixture. The resulting pigment-bearing granules are then directly ready for use in the desired thermoforming or molding operation, e.g., for the manufacture of plastic bottles by blowmolding. By proceeding in the manner just described, only a single pass through an extruder is required instead of the three or more mechanical workings which are characteristic of prior practice. The pearlescent material is thus dispersed in the resin with a minimum of mechanical fracture or attrition and with a minimum of thermal decomposition. In contrast, it appears that such mechanical and thermal degradation of the pearlescent pigment crystals or lamellae was very pronounced and responsible for their relative ineffectiveness when such crystals were conventionally worked into a tough resin such as high-density polyethylene, because of the intense kneading at relatively high processing temperatures required to obtain a proper dispersion of the pigment in such a resin.

Various nacre producing substances are known and suitable for use in the present invention. Preferred is basic lead carbonate but other materials of inorganic or organic origin can be used similarly. Typical other inorganic materials are lead acid phosphate, lead acid arsenate, zinc phosphate, lead pyrophosphate, zinc ammonium phosphate, magnesium ammonium phosphate, mica and the like. Typical of the organic materials in pearl essence, which is a guanine composition derived from fish, soaps such as calcium stearate, etc.

In order to obtain the multiple reflectivity required to produce the desired pearlescent effect, the pearlescent additive or pigment should be in the form of small platelets having a diameter across the face thereof of from about 3 to 70 microns and a thickness of from about 0.5 micron or less to about 5 microns. An average crystal face diameter of about 5 to 10 microns and a thickness of about 0.5 to 2 microns, i.e., a ratio of diameter to thickness of at least 4, are preferred. While some degradation of the crystals during processing is all but unavoidable, desirably such degradation should be as slight as possible, such that the average crystal face diameter in the final plastic produced should be not less than about 1 micron, e.g., between about 2 and 5 microns.

When the pearlescent pigment crystals are incorporated in a transparent or translucent base and oriented into parallel layers at different depths therein, light is reflected simultaneously in a given direction from a multitude of surfaces and thus produces the type of luster which is characterized as pearly. As the intensity of reflectance at a boundary between two transparent substances depends on the difference between their indices of refraction, it is desirable that the index of refraction of the pearlescent crystals differ from the index of refraction of the resin in which they are embedded by at least about 0.2. Thus, since the polyolefin resins with which this invention is principally concerned have indices of refraction in the range of about 1.50 to 1.60, the nacreous crystals used should have indices above 1.70 and preferably between about 1.80 and 3.00. Basic lead carbonate crystals, which have an index of refraction between about 1.90 and 2.10, have been found particularly effective because of their excellent mechanical and crystalline properties and their relatively good thermal stability.

For use in the present invention the pearlescent crystals are first formed into a concentrated paste by dispersing them in a suitable clear, light-transmitting liquid vehicle which at least in minor proportions is compatible with the resin or plastic in which it is to be incorporated. The vehicle should comprise an oily liquid which is freeflowing and substantially non-volatile at room temperature, e.g., one having a boiling point in excess of about 200° C. and preferably in excess of about 300° C. The oily vehicle which coats the small crystals of pearlescent material keeps the latter from agglomerating, minimizes fracture, facilitates uniform distribution of the crystals on the surface of the resinous molding powder in the initial coating step, as well as their parallel orientation upon dispersion in the resin. Suitable examples of such vehicles include $C_4$ to $C_{12}$ alkyl esters of acids such as phosphoric acid, phthalic acid and acids of the oxalic acid series having from 6 to about 10 carbon atoms per molecule, such as adipic acid or sebacic acid. Dioctyl phthalate, dibutyl phthalate, and various mixtures thereof have been found particularly useful in the practice of the present invention. Highly refined white mineral oils can also be used. Small amounts of relatively volatile liquids such as water or butyl acetate may be included in the vehicle to modify its viscosity or for other purposes.

The invention is useful for incorporating a fragile lamellar additive to any plastic but is of particular advantage in connection with tough high melting plastics, in particular with molding-grade polypropylene and high-density polyethylene resins, i.e., polyethylene having a density of about 0.945, a number average molecular weight of about 40,000 to 200,000 or more, e.g., 50,000 to 100,000, and a crystalline melt point of about 135° C. or higher. Normally, such resins require processing temperatures above 180° C., usually between about 180° and about 220° C. This is to be contrasted with processing temperatures of 175° C. or less which are commonly used for mixing or compounding low-density polyethylene and the other old type thermoplastics. For use in the present invention, as in molding operations generally, the molding resin is desirably supplied in the form of molding powder, that is, small pellets or cylindrical granules which may have an average particle diameter of about 0.03 to 0.3 inch, e.g., $\frac{1}{16}$ or $\frac{1}{8}$ inch. Such powder may consist either of natural unpigmented resin or of resin suitably colored with any of the conventional coloring agents such as ultramarine blue, phthalocyanine blue, chromium oxide, cadmium red, cadmium yellow, benzidene yellow, phthalocyanine green, etc. The use of titanium dioxide pigment is best avoided as its high degree of opacity or color density tends to defeat the effect of the pearlescent pigment. Of course, instead of using a molding powder wherein all particles are of the same color, it is possible to practice the present invention with mixtures of particles of different colors, e.g., natural resin powder dry-blended with a suitable proportion of a color concentrate powder. If white luster color is to be produced, excellent results can be obtained by incorporating basic lead carbonate crystals in high-density polyethylene in accordance with this invention, without addition of any other pigment.

An essential feature of the present invention involves a coating operation wherein the pearlescent pigment is added as a concentrated paste to the granular molding resin, and wherein the resulting mixture is then gently stirred or tumbled at a moderate temperature (e.g., 5° to 40° C.) until the molding powder becomes substantially uniformly coated with the paste. This can usually be accomplished in about 0.5 to 5 minutes, preferably in about 1 to 3 minutes. For instance, good coating of the molding powder with the paste can be obtained by slowly stirring appropriate quantities of the molding powder and the pasty additive in an open pail by means of a wooden or plastic paddle which can be operated by hand or by a suitable slowly revolving mechanism. Alternately, suitable mixing may be obtained by partially filling a mixing drum with the molding powder and pasty additive and then tumbling the mixture in the drum. A ribbon blender provides still another suitable mixing mechanism. As is well known, such a blender is a tank with a horizontal motor driven shaft running through the tank center. A slat or ribbon is spiralled for its full length and is mounted equidistant from the shaft center. When compounds and additives are charged through the opening in the tank, a thorough mixture is obtained. An exit door is suitably placed for removal of the finished mixture.

In carrying out the mixing operation, the paste mix is weighed and a proper quantity dropped on the mass of molding powder with which it is to be mixed. For instance, a weighed quantity of pearlescent paste may be dropped into a drum partially filled with a known quantity of molding powder, whereupon the drum is closed and tumbled for about 2 minutes. Excessive mixing tends unnecessarily to reduce the crystal size of the pearlescent material and hence would result in blownware with a less pronounced luster than can be obtained when the time of mixing is held to a minimum. To accomplish the distribution of the pasty additive on the molding powder with a minimum of crystal degradation, it has been found advantageous to revolve or drive the drum or other mixing mechanism at a speed of about 60 r.p.m. Of course, the optimum mixing speed will vary somewhat depending on the equipment used, but satisfactory mixing conditions can be readily determined by preliminary trial runs. After mixing as indicated, the resulting batch of molding powder carrying a thin film of pearlescent additive deposited thereon can then be charged directly to the hopper of a blowmolding or other thermoforming apparatus for the manufacture of the desired plastic articles therefrom in an otherwise conventional manner.

The paste of pearlescent additive used in this process desirably comprises about 20 to 70 percent of the liquid vehicle and correspondingly about 80 to 30 percent of the solid pearlescent crystals, pearlescent concentrations in the range of from about 50 to 65 percent being preferred. In other words, the paste is made up by adding 100 parts of the solid pearlescent crystals to about 25 to 250 parts, or preferably to 50 to 100 parts of the liquid vehicle. Since the crystals tend to settle and the liquid vehicle tends to rise in such a mixture on storage, it is important to obtain a uniform mix prior to use.

In producing the desired pearlescent effect in accordance with the present invention it is desirable to form the final product from a resin containing the pearlescent crystals in a concentration of from about 0.1 to about 5%, preferably from about 0.3 to about 2%. Thus, for instance, when working with a paste containing 60% pearlescent crystal and 40% liquid vehicle, excellent results can be obtained by mixing one part of such a paste with about 30 to 200 pounds of natural resin molding powder or with a dry mix of natural and color concentrate molding powder.

A typical embodiment of the invention is more specifically described below.

Example

A pearlescent additive paste (hereafter referred to as "Paste A") was prepared as follows. 6 parts of crystalline basic lead carbonate or "white lead" and 4 parts of a liquid vehicle containing equal parts of dibutyl phthalate and dioctyl phthalate were gently stirred together in a glass beaker with a rotary motion of about 100 turns, using a wooden tongue depressor or small flat wooden paddle as a stirrer. The white lead used was in the form of essentially hexagonal platelets having an average face diameter of about 7 to 8 microns.

A molding powder (hereafter referred to as "Molding Powder B") was prepared by dry mixing 240 parts of natural high-density polyethylene molding powder and 10 parts of a color concentrate powder of high-density polyethylene containing about .48% of blue color ("Monastral Blue BT449D") until an essentially uniform mixture was obtained. The average particle size of the two molding powders was ⅛ inch. One part of Paste A was then added to a pail containing 45 parts of the Molding Powder B, dropping the paste onto the powder near the center of the pail. The desired quantity of paste was dispensed by means of a pre-calibrated positive displacement filler of the type commonly used for dispensing cream in restaurants. In such a device the liquid or paste to be metered out moves into a pump cylinder on the upstroke of a manually operated handle and is discharged downwardly from the nozzle on the downstroke, the volume dispensed being accurately predetermined by means of an adjustable stop which controls the stroke length of the piston. The paste in the storage funnel or hopper should be gently stirred from time to time when the dispensing device is used over an extended period, to assure that the pigment crystals remain uniformly dispersed in the liquid vehicle.

When the paste was dropped into the pail containing the resin powder, the contents were gently stirred by hand with a flat wooden paddle for 2 minutes to distribute the paste substantially evenly on the resin particles.

The resulting molding powder coated with the pearlescent paste was then formed into plastic bottles in a conventional blowmolding machine. The plastic bottles produced had an excellent lustrous appearance. The average pearlescent crystal size in the finished blowmolded bottle was about 2 to 4 microns, indicating a surprisingly slight degree of degradation of crystal size in the process.

In a comparative run, Paste A and Molding Powder B were mixed together in the same proportions as before, but using the conventional sequence of extrusion steps involving first the preparation of a master batch containing 3% of the pearlescent pigment, then a concentrate containing 1½% of the pearlescent pigment and only then, finally, the desired colored molding stock. The average crystal size in bottles blowmolded from this stock was about 1 to 2 microns and the bottles had a distinctly less "soft," less lustrous appearance.

The essential features of the invention are particularly pointed out in the appended claims.

What is claimed is:

1. A process for making molding resin for the production of pearlescent plastic articles, which comprises adding a paste consisting essentially of 30 to 80% of solid pearlescent crystal platelets having a face diameter of from about 3 to 70 microns and 70 to 20% of a non-volatile oily liquid having a boiling point in excess of about 200° C., to a thermoplastic resin requiring a processing temperature in excess of about 175° C., in an amount calculated to provide about 0.2 to 5% of crystals in the resin, and coating the resin particles with said paste by gently mixing the paste and resin at a temperature between about 10° and 40° C. without mastication, and without subjecting the mixture to any substantial back pressure.

2. A process according to claim 1 wherein the resin is high-density polyethylene.

3. A process according to claim 1 wherein the resin is polypropylene.

4. A process according to claim 1 wherein the non-volatile liquid vehicle is an alkyl phthalate ester containing alkyl groups of 4 to 12 carbon atoms.

5. A process according to claim 4 wherein the pearlescent platelets comprise organic pearl essence.

6. A process according to claim 4 wherein the pearlescent platelets are of basic lead carbonate having an average face diameter of about 5 to 10 microns, and are present in a concentration of 0.3 to 2% based on the total amount of resin.

7. A process which comprises blow molding at a temperature above about 175° C. a substantially transparent pearlescent plastic article from a thermoplastic molding powder which has been coated with a paste consisting essentially of 30 to 80% of pearlescent crystal platelets in 70 to 20% of a non-volatile inert vehicle, said crystals having an average particle diameter of at least 3 microns and being present on said molding powder to provide a crystal concentration of about 0.2 to 5% in the finished plastic article.

8. A process for making substantially transparent pearlescent articles by thermoforming from polyethylene resin, which comprises adding a paste consisting essentially of 40 to 70% of crystal-like platelets of a transparent pearlescent pigment having an average particle size of about 5 to 10 microns and 60 to 30% of a non-volatile inert liquid vehicle having a boiling point in excess of about 200° C., to a granular, substantially transparent high-density polyethylene molding powder having an average particle size of about ⅟₁₆ to ¼ inch, in an amount calculated to provide 0.5 to 2% pearlescent platelets in the molding powder, gently stirring the resulting mixture of molding powder and paste for a period of about ½ to 3 minutes to distribute the paste on the powder particles and blow molding the resulting paste-bearing particles at a temperature in excess of about 175° C. to produce a pearlescent article therefrom.

9. A process for making pearlescent plastic bottles from high-density polyethylene having a density of about 0.945, which process comprises adding a paste consisting essentially of 40 to 70% of crystalline basic lead carbonate having an average face diameter of about 5 to 10 microns and a thickness of about 0.5 to 2 microns and dispersed in a $C_4$ to $C_{12}$ alkyl phthalate vehicle to a granular high-density polyethylene molding powder having an average particle size of about ⅟₁₆ to ¼ inch, said paste being added to said polyethylene powder in an amount calculated to provide about 0.2 to 5% of the basic lead carbonaate based on the polyethylene, gently stirring the resulting mixture of molding powder and paste at a temperature between about 5 and 40° C. to for about 0.5 to about 5 minutes, distribute the paste substantially uniformly on the powder particles, and processing the resulting paste-bearing particles in a blowmolding zone at a temperature between about 180 and about 220° C. to produce pearlescent bottles therefrom.

References Cited

UNITED STATES PATENTS

| | | | |
|---|---|---|---|
| 350,924 | 6/1931 | Clement | 106—198 |
| 2,713,004 | 7/1955 | Greenstein | 106—193 |
| 2,851,370 | 9/1958 | Blank | 106—193 |
| 2,863,783 | 12/1958 | Greenstein | 106—193 |
| 3,107,173 | 10/1963 | Klenke | 106—291 |
| 3,217,071 | 11/1965 | Plymale et al. | 264—98 |
| 2,816,044 | 12/1957 | Deutsch et al. | 260—38 |
| 2,945,770 | 7/1960 | Suchow | 106—291 |
| 2,971,223 | 2/1961 | Grunin et al. | 264—108 |
| 3,041,670 | 7/1962 | Broderson | 264—108 |
| 3,008,844 | 11/1961 | Grunin | 106—193 |

ALLAN LIEBERMAN, *Primary Examiner*.

UNITED STATES PATENT OFFICE
CERTIFICATE OF CORRECTION

Patent No. 3,382,201                          May 7, 1968

Ira H. Gutman et al.

It is certified that error appears in the above identified patent and that said Letters Patent are hereby corrected as shown below:

Column 6, line 43, before "pearlescent" insert -- transparent --. Column 7, line 1, "carbonaate" should read -- carbonate --; line 3, cancel "to".

Signed and sealed this 9th day of September 1969.

(SEAL)

Attest:

Edward M. Fletcher, Jr.                      WILLIAM E. SCHUYLER, JR.

Attesting Officer                              Commissioner of Patents